Figure 1:
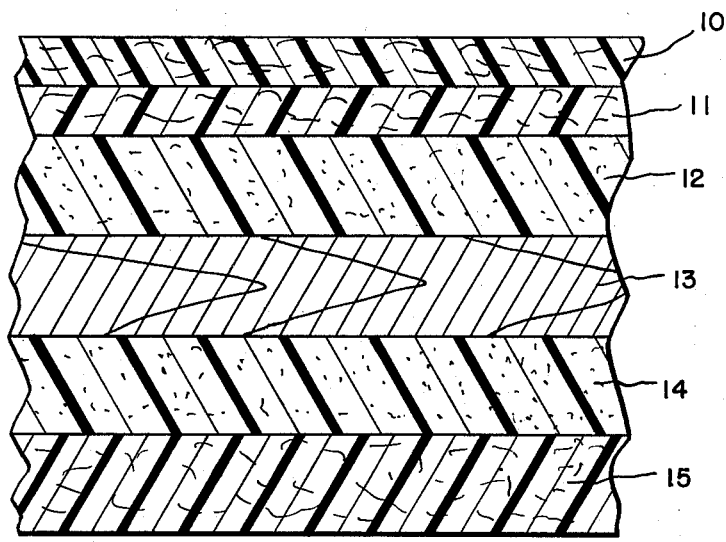

July 4, 1961     H. L. KANE ET AL     2,991,215
LAMINATED PANELS AND METHOD OF MANUFACTURE
Filed May 29, 1956

INVENTORS.
HOWARD L. KANE
BY MOSES KONIGSBERG

ATTORNEY

United States Patent Office 2,991,215
Patented July 4, 1961

2,991,215
LAMINATED PANELS AND METHOD OF MANUFACTURE
Howard L. Kane, Stamford, and Moses Konigsberg, Westport, Conn., assignors to Polymer Industries Inc., Springdale, Conn., a corporation of Delaware
Filed May 29, 1956, Ser. No. 588,052
2 Claims. (Cl. 154—121)

This invention relates to decorative laminated panels and specifically to laminated panels wherein decorative foils are used as part of a laminated structure.

Presently known decorative laminated panels are dependant upon the use of phenolics for their fabrication. The long curing time involved in manufacturing articles containing phenolics substantially limits production and increases costs. Laminated decorative board has heretofore required the use of presses capable of applying pressures of from 1200 to 1500 p.s.i. in order to produce articles having a smooth surface.

Accordingly, it is an object of the present invention to produce a decorative laminated panel using relatively low pressures.

Another object of the present invention is to produce a decorative laminated panel at a rate heretofore unknown in the art.

A further object of the present invention is to produce an inexpensive decorative laminated panel.

An object of the present invention is to produce a stable laminated panel.

A feature of the present invention is its use of a cushioning, pressure equalizing core within the lamination.

Another feature of the present invention is its use of both thermoplastic and thermosetting resin compositions within a laminated panel.

A further feature of the present invention is its use of a single compression cycle for complete fabrication of the laminated panel.

The invention consists of the construction, combination and arrangement of parts, as herein illustrated, described and claimed.

In the accompanying drawing, forming a part hereof, is illustrated one form of embodiment of the invention, and in which:

FIGURE 1 is a vertical section taken through a complete embodiment of the present invention, greatly enlarged.

Referring to the drawing, 10 indicates a foil of melamine resin impregnated paper containing approximately 65% of resin therein. This paper is commonly known as the overlay paper in the decorative board art. Beneath the overlay paper 10 is a foil of a melamine formaldehyde resin impregnated decorative sheet of paper 11. The decorative sheet 11 is commercially available with 40 to 50% resin therein, and in this form is suitable for the present invention. The patterns which may be used in the decorative sheet may vary widely and include colorful wall paper designs, marble simulating lithographs or rare woods. Other transparent resins which will form a good bond with the melamine such as, polyvinyl chloride and polyvinyl acetate, may be used to impregnate the decorative sheet 11.

A cushioning or pressure equalizing layer 12 underlies the decorative sheet 11. The cushioning layer 12 consists of some fibrous felted cellulosic material, such as bagasse board, sold commercially under the trademark Celotex, insulating fibre board, such as is made of wood, wool felt and the like. From 3% to 50% resin is incorporated with the board, of which up to 10% may consist of thermo-setting resins, while the remainder is thermoplastic.

Thermoplastic resins such as may be used for this purpose are, for example:

Polyvinyl acetate; polyvinyl acetate copolymers; polyvinyl chloride; polyethylidene chloride (commercially sold as Saran).

Any thermoplastic resin that can be introduced into the panel structure will serve the purpose of the present invention.

The thermosetting resin, which may be used in conjunction with the present structure, may be, for example: melamine formaldehyde; urea formaldehyde; phenol formaldehyde; or any aldehyde resin. Any thermosetting resin that can be introduced into the panel structure will serve the purpose of the present invention.

By uing a combination of thermosetting and thermoplastic materials, a degree of stability can be maintained within the panel during its fabrication and in the completed article. The thermosetting resin prevents cold flow within the structure, while the thermoplastic resin binds the fibrous material together and provides a less brittle finished article.

The previously described structure consisting of the overlay paper, the decorative sheet and the cushioning layer impregnated with the thermosetting and thermoplastic resins, may be placed within a press and subjected to a pressure of between 250–500 p.s.i. at a temperature of between 250°–350° F. The cushioning layer 12 will act to equalize the pressure over the entire structure of the lamination, and the resulting product will be a laminated panel having an extremely smooth surface.

The laminated panel thus formed may be secured to any suitable support such as is the common practice with such articles. In the above described structure the resin which has been incorporated in the cushioning layer 12 may be used as an adhesive for this purpose.

In order to form a self-supporting structure, the previously described lamination may have added thereto some suitable core material 13, such as plywood, rough lumber, bagasse board or the like. Beneath the core material 13 may be placed another layer 14, similar in composition to the cushioning layer 12. A balancing sheet 15 underlies the second resin-bearing sheet 14, and may consist of paper or felt into which has been introduced a quantity of resin equal to that carried by the overlay paper 10 and the decorative sheet 11. The balancing sheet is desirable for the purpose of preventing warp.

The entire structure consisting of the overlay paper 10, the decorative sheet 11, the cushioning layer 12, the core material 13, the second cushioning sheet 14, and the balancing sheet 15, may be placed within a press and subjected to the same 250–400 p.s.i. pressure at a temperature of 250°–350° F. to produce a highly stable, smooth-surfaced laminated panel structure.

An example of a composition suitable for use in conjunction with the cushioning layer is as follows:

| | Parts |
|---|---|
| Water | 895 |
| Polyvinyl chloride, 50% aqueous dispersion | 25 |
| Polyvinyl acetate, 55% aqueous dispersion | 75 |
| Melamine resin, 80% aqueous solution | 5 |

In the above example, the thermosetting resin comprises approximately 7% of the resinous material therein.

The felted fibre board, such as Celotex bagasse board, of a thickness of one-quarter inch is saturated with the above composition and the excess liquid squeezed out by pressure rolls. The board is then dried at a temperature below 200° F. The dried resin pickup is about 15–20% the total dry weight. A specific example of a laminated decorative panel may be made up as follows:

(1) Overlay sheet of melamine resin impregnated paper containing 65% of melamine resin.

(2) A decorative sheet containing 45% of melamine resin.
(3) The above described resin-impregnated bagasse board.
(4) Plywood, ½ inch rough fir phenolic laminated.
(5) The above described resin-impregnated bagasse board.
(6) Balancing sheet containing 55% of melamine resin.

The entire assembly is thereafter subjected to heat and pressure as herein described to form a unitary laminated panel.

It is within the purview of the present invention to employ as a balancing sheet 15, the same decorative material 11, hereinabove described, to produce a decorative surface on both sides of the board.

From the foregoing, it will be seen that there has been described a structure and method of making decorative sheets employing pressure and temperatures far below those commonly needed to produce such products by previously known methods.

Having thus fully described the invention, what is claimed as new, and desired to be secured by Letters Patent of the United States, is:

1. A decorative laminated panel comprising a layer of approximately 65% melamine resin impregnated overlay paper, a decorative sheet having a 40% to 50% transparent resin consisting of melamine formaldehyde incorporated therein beneath the overlay, a compressible pressure equalizing layer consisting of a fibrous felted cellulosic material beneath the decorative sheet, said pressure equalizing layer being of a thickness of approximately ¼ inch and having from 3% to 50% resinous material incorporated therein of which approximately 7% to 10% is a thermosetting resin and the remainder thermoplastic resins, the whole being united in the presence of heat and pressure to form a laminated structure and subsequently cooled to substantially increase the yield strength of the said pressure equalizing layer.

2. A method of producing a laminated panel assembly which consists in the steps of placing a layer of melamine resin impregnated overlay paper over a decorative sheet having 40% to 50% transparent melamine formaldehyde resin incorporated therein, mounting said overlay paper and decorative sheet on a compressible pressure equalizing layer of fibrous felted cellulosic material, said layer being approximately ¼ inch in thickness and having from 3% to 50% resinous material incorporated therein of which approximately 7% to 10% is a thermosetting resin and the remainder thermoplastic resins, and subjecting the panel assembly to not more than 350° F. heat and not more than 400 p.s.i. pressure to form a unitary laminated structure.

References Cited in the file of this patent

UNITED STATES PATENTS

| | | |
|---|---|---|
| 1,454,845 | Clay | May 15, 1923 |
| 1,597,539 | Novotny et al. | Aug. 24, 1926 |
| 1,697,182 | Hall et al. | Jan. 1, 1929 |
| 2,084,081 | Faber | June 15, 1937 |
| 2,459,739 | Groten et al. | Jan. 18, 1949 |
| 2,550,465 | Gorski | Apr. 24, 1951 |
| 2,552,124 | Tallman | May 8, 1951 |
| 2,562,711 | Gessler | July 31, 1951 |
| 2,564,695 | Johnson et al. | Aug. 21, 1951 |
| 2,801,198 | Morris et al. | July 30, 1957 |
| 2,822,026 | Willis | Feb. 4, 1958 |
| 2,857,302 | Burton et al. | Oct. 21, 1958 |